(12) United States Patent
Taguchi (10) Patent No.: US 9,587,748 B2
(45) Date of Patent: Mar. 7, 2017

(54) CONTROL VALVE AND VARIABLE-DISPLACEMENT COMPRESSOR PROVIDED WITH SAID CONTROL VALVE

(71) Applicant: SANDEN HOLDINGS CORPORATION, Isesaki-shi (JP)

(72) Inventor: Yukihiko Taguchi, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 0 days.

(21) Appl. No.: 14/777,045

(22) PCT Filed: Mar. 18, 2014

(86) PCT No.: PCT/JP2014/057361
§ 371 (c)(1),
(2) Date: Sep. 15, 2015

(87) PCT Pub. No.: WO2014/148497
PCT Pub. Date: Sep. 25, 2014

(65) Prior Publication Data
US 2016/0033046 A1 Feb. 4, 2016

(30) Foreign Application Priority Data

Mar. 22, 2013 (JP) ................................. 2013-060719

(51) Int. Cl.
*F16K 31/06* (2006.01)
*F16K 1/32* (2006.01)
(Continued)

(52) U.S. Cl.
CPC ............ *F16K 1/32* (2013.01); *F04B 27/1804* (2013.01); *F16K 27/029* (2013.01);
(Continued)

(58) Field of Classification Search
CPC .... F16K 1/32; F16K 31/0675; F16K 31/0603; F16K 27/029; F16K 27/048;
(Continued)

(56) References Cited

U.S. PATENT DOCUMENTS 3,446,473 A * 5/1969 Barker ................ F16K 31/0651
251/64
3,484,076 A * 12/1969 Naumann ........... F16K 31/0658
251/129.15
(Continued)

FOREIGN PATENT DOCUMENTS

| CN | 1646808 | 7/2005 |
|---|---|---|
| CN | 101124405 | 2/2008 |

(Continued)

*Primary Examiner* — John Bastianelli
(74) *Attorney, Agent, or Firm* — Cozen O'Connor (57) ABSTRACT

A control valve capable of reducing vibration of a housing member, and a variable-displacement compressor provided with this control valve, are provided. A control valve 300 includes: a valve unit 310 having a valve body 304 and a movable iron core 308; a housing member 312 which is formed into a bottomed tubular shape and slidably houses the movable iron core 308; and a coil unit 313 having a drive coil portion 313A housed in a solenoid housing 311 to be disposed around the housing member 312, and an end portion member 313B formed to cover a tube bottom side end portion 312*e*. The control valve drives and controls the valve unit 310 by an electromagnetic force thereby adjusting an opening degree of the valve body 304. A first damping member 314 is disposed between a bottom wall 312*b* of the housing member 312 and the end portion member 313B.

9 Claims, 9 Drawing Sheets

(51) Int. Cl.
  *F04B 27/18* (2006.01)
  *F16K 27/02* (2006.01)
  *F16K 27/04* (2006.01)
(52) U.S. Cl.
  CPC ........ *F16K 27/048* (2013.01); *F16K 31/0603* (2013.01); *F16K 31/0675* (2013.01); *F04B 2027/1813* (2013.01); *F04B 2027/1827* (2013.01); *F04B 2027/1831* (2013.01); *F04B 2027/1845* (2013.01)
(58) Field of Classification Search
  CPC .......... F04B 27/1804; F04B 2027/1831; F04B 2027/1827; F04B 2027/1845; F04B 2027/1813
  USPC ........................ 251/129.15, 64; 335/257, 277
  See application file for complete search history.

(56) References Cited

U.S. PATENT DOCUMENTS

| | | | | |
|---|---|---|---|---|
| 3,707,992 A | * | 1/1973 | Ellison | F16K 31/0627 251/129.15 |
| 4,523,739 A | * | 6/1985 | Johansen | F16K 31/0606 137/625.65 |
| 5,553,829 A | * | 9/1996 | Hemsen | F16K 31/0696 251/64 |
| 5,565,832 A | * | 10/1996 | Haller | H01F 7/088 335/277 |
| 6,830,232 B2 | * | 12/2004 | Burrola | F02M 25/0836 251/64 |
| 6,913,242 B2 | * | 7/2005 | Reichert | H01F 7/088 251/64 |
| 6,935,612 B2 | * | 8/2005 | McCombs | F16K 31/0696 335/257 |
| 7,422,193 B2 | * | 9/2008 | Sisk | F16K 31/0655 251/64 |
| 2008/0138213 A1 | | 6/2008 | Umemura et al. | |
| 2008/0175727 A1 | | 7/2008 | Umemura et al. | |

FOREIGN PATENT DOCUMENTS

| | | |
|---|---|---|
| CN | 101225810 | 7/2008 |
| JP | 02-60781 | 5/1990 |
| JP | 5-263961 | 10/1993 |
| JP | 07-41167 | 7/1995 |
| JP | 2002-252114 | 9/2002 |
| JP | 2008-157031 | 7/2008 |
| WO | WO 2006/090760 | 8/2006 |

\* cited by examiner

CONTROL VALVE AND VARIABLE-DISPLACEMENT COMPRESSOR PROVIDED WITH SAID CONTROL VALVE

RELATED APPLICATIONS

This is a U.S. National Phase Application under 35 U.S.C. 371 of International Application PCT/JP2014/057361 filed on Mar. 18, 2014.

This appliation claims priority of Japanese application no. 2013-060719 filed Mar. 22, 2013, the entire content of which is hereby incorporated by reference.

TECHNICAL FIELD

The present invention relates to a control valve and a variable-displacement compressor, and more particularly, relates to a control valve that adjusts a valve opening degree to perform driving control, and a variable-displacement compressor provided with this control valve.

BACKGROUND ART

As this type of control valve, there is, for example, a control valve disclosed in Patent Document 1. This control valve is applied to, for example, a use application in which the control valve is interposed in a pressure supply passage allowing a discharge chamber of a variable-displacement compressor to communicate with a control pressure chamber, and variably controls a discharge displacement. Furthermore, in this control valve, a movable iron core coupled with a valve body that opens and closes a fluid passage in a valve housing is housed in a tubular housing member with a bottom, and in this housing member, the movable iron core is driven by an electromagnetic force in a state in which an outer peripheral surface of the movable iron core is guided.

REFERENCE DOCUMENT LIST

Patent Document

Patent Document 1: International Publication No. 2006/090760

SUMMARY OF THE INVENTION

Problems to be Solved by the Invention

However, when driving control is performed by, for example, PWM control in such a control valve, a movable iron core repeatedly receives an external force corresponding to a current amplitude to vibrate, and hence, collision occurs between an outer peripheral surface of the movable iron core and an inner peripheral surface of a housing member, which becomes a cause for generation of noise. Furthermore, such a control valve is housed in a housing hole of a cylinder head of a variable-displacement compressor, and noise is directly radiated from an end portion of the control valve to the outside. Such a problem is not limited to the control valve which performs the driving control by the PWM control, but is a common problem in the control valve having the possibility that this movable iron core collides with the housing member when the movable iron core is driven.

The present invention has been developed in view of the above problem, and an object thereof is to provide a control valve in which vibration of a housing member is reduced and a variable-displacement compressor provided with this control valve.

Means for Solving the Problems

Thus, a control valve of the present invention includes: a valve unit having a valve body that opens and closes a fluid passage in a valve housing, and a movable iron core coupled with the valve body; a housing member which is formed into a tubular shape with a bottom and slidably houses at least the movable iron core; and a coil unit having a drive coil portion housed in a solenoid housing fixed to the valve housing to be disposed around the housing member, and an end portion member integrated with the drive coil portion and formed to cover a tube bottom side end portion of the housing member. The control valve is configured to drive and control the valve unit by an electromagnetic force generated by the drive coil portion, thereby adjusting an opening degree of the valve body, and a first damping member is disposed between a bottom wall of the housing member and the end portion member.

In addition, a variable-displacement compressor of the present invention includes a pressure supply passage that allows a discharge chamber of a refrigerant gas to communicate with a control pressure chamber, and the abovementioned control valve interposed in the pressure supply passage. The control valve adjusts an opening degree of the pressure supply passage to control a pressure of the control pressure chamber, and to make a discharge displacement of the refrigerant gas variable.

Effects of the Invention

According to the control valve of the present invention, a first damping member is disposed between a bottom wall of a housing member which slidably houses a movable iron core coupled with a valve body for opening and closing a fluid passage, and an end portion member of a coil unit, and hence, even when the movable iron core vibrates, so as to repeatedly collide with a peripheral wall of the housing member, the vibration of the housing member can be reduced by the first damping member, and ultimately, the collision of the housing member with the end portion member can be reduced, so that noise to be radiated from the control valve to the outside can effectively be reduced.

In addition, according to a variable-displacement compressor of the present invention, the control valve in which the vibration is reduced is used, and hence, noise to be radiated from the control valve to the outside can be reduced.

MODE FOR CARRYING OUT THE INVENTION

Hereinafter, embodiments of the present invention will be described with reference to the drawings.

Figure 1:
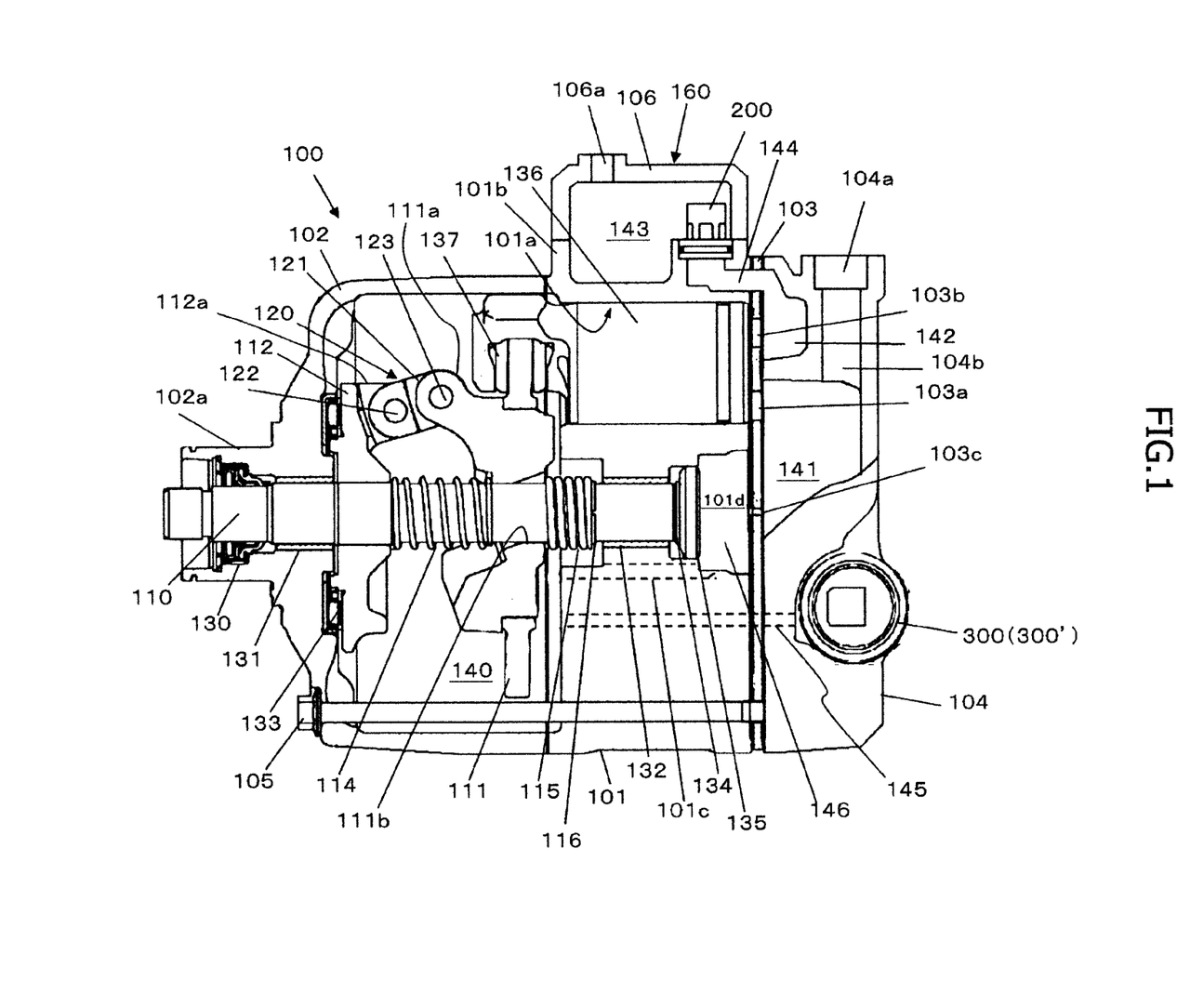
FIG. 1 is a cross-sectional view of a variable-displacement compressor in which a control valve according to a first embodiment of the present invention is used.

FIG. 1 illustrates a schematic constitution of a variable-displacement compressor in which a control valve according to a first embodiment of the present invention is used, and an example of a clutchless variable-displacement compressor for use in an air conditioning system for a vehicle.

In FIG. 1, a variable-displacement compressor 100 includes a cylinder block 101 in which a plurality of cylinder bores 101a are formed, a front housing 102 disposed at one end of the cylinder block 101, and a cylinder head 104 disposed at the other end of the cylinder block 101 via a valve plate 103 and the like.

A drive shaft 110 is disposed to cross an inside of a crank chamber 140 serving as a control pressure chamber formed by the cylinder block 101 and the front housing 102. Around an intermediate portion of the drive shaft 110 in an axial direction, a swash plate 111 is disposed. The swash plate 111 couples with a rotor 112 fixed to the drive shaft 110 via a link mechanism 120, and is supported by the drive shaft 110 so that an inclination angle is changeable.

The link mechanism 120 includes a first arm 112a projecting from the rotor 112, a second arm 111a projecting from the swash plate 111, and a link arm 121 having one end rotatably coupled with the first arm 112a via a first coupling pin 122 and having the other end rotatably coupled with the second arm 111a via a second coupling pin 123.

A through hole 111b of the swash plate 111 is formed in such a shape that allows the swash plate 111 to incline in a range of a maximum inclination angle (θmax) to a minimum inclination angle (θmin), and in the through hole 111b, a minimum inclination angle regulating portion that abuts on the drive shaft 110 is formed. In a case in which the inclination angle of the swash plate 111 when the swash plate 111 is perpendicular to the drive shaft 110 is defined as 0°, the minimum inclination angle regulating portion of the through hole 111b is formed so that the swash plate 111 can be displaced up to an inclination angle of about 0°. It is to be noted that the maximum inclination angle of the swash plate 111 is regulated by allowing the swash plate 111 to abut on the rotor 112.

Between the rotor 112 and the swash plate 111, an inclination angle decreasing spring 114 that urges the swash plate 111 toward the minimum inclination angle is attached around the drive shaft 110. In addition, between the swash plate 111 and a spring support member 116 disposed in the drive shaft 110, an inclination angle increasing spring 115 that urges in a direction in which the inclination angle of the swash plate 111 increases is attached around the drive shaft 110. Here, an urging force of the inclination angle increasing spring 115 at the minimum inclination angle is set to be greater than an urging force of the inclination angle decreasing spring 114, and when the drive shaft 110 does not rotate, the swash plate 111 is positioned at the inclination angle at which the urging force of the inclination angle decreasing spring 114 and the urging force of the inclination angle increasing spring 115 are balanced.

One end of the drive shaft 110 extends through a boss portion 102a of the front housing 102 to extend to the outside of the front housing 102, and is coupled with a power transmitting device (not shown). Between the drive shaft 110 and the boss portion 102a, a shaft sealing device 130 is interposed, and an inner portion of the crank chamber 140 is cut off from an external space.

A coupled body of the drive shaft 110 and the rotor 112 is supported by bearings 131 and 132 in a radial direction, and supported by a bearing 133 and a thrust plate 134 in a thrust direction. A clearance between a portion on which the thrust plate 134 of the drive shaft 110 abuts and the thrust plate 134 is adjusted into a predetermined clearance by an adjusting screw 135. Furthermore, a power from an external drive source (an engine of the vehicle) is transmitted to the power transmitting device, and the drive shaft 110 rotates in synchronization with the power transmitting device.

In the cylinder bores 101a, there is disposed a piston 136 that compresses a refrigerant gas drawn into from an aftermentioned suction chamber 141 to discharge the gas to a discharge chamber 142, and an outer peripheral portion of the swash plate 111 is housed in an inside space of an end portion of the piston 136 which projects toward a crank chamber 140, so that the swash plate 111 interlocks with the piston 136 via a pair of shoes 137. Therefore, by the rotation of the swash plate 111, the piston 136 reciprocates in the cylinder bores 101a.

The suction chamber 141 is formed in a central portion of the cylinder head 104, and the discharge chamber 142 is formed at such a position to annularly surround the suction chamber 141. The suction chamber 141 communicates with the cylinder bores 101a via a communication hole 103a disposed in the valve plate 103 and a suction valve (not shown) formed in a suction valve forming body, and the discharge chamber 142 communicates with the cylinder bores 101a via a communication hole 103b disposed in the valve plate 103 and a discharge valve (not shown) formed in a discharge valve forming body.

The front housing 102, a center gasket (not shown), the cylinder block 101, a cylinder gasket (not shown), the suction valve forming body (not shown), the valve plate 103, the discharge valve forming body (not shown), a head gasket (not shown) and the cylinder head 104 are fastened by a plurality of through bolts 105, and a compressor housing is formed.

In the cylinder head 104, a suction passage 104b including a suction port 104a is formed, the suction port 104a is connected to a low pressure side refrigerant circuit (a suction side refrigerant circuit) of the abovementioned air conditioning system for the vehicle, and the suction passage 104b is linearly extended to cross a part of the discharge chamber 142 from an outer periphery of the cylinder head 104. In consequence, the refrigerant gas flows into the suction chamber 141 from the suction passage 104b.

At the top of the cylinder block 101, there is disposed a muffler 160 that reduces noise and vibration due to pulsation of a refrigerant. The muffler 160 is formed by fastening a lid member 106 to a forming wall 101b defined and formed in the upper portion of the cylinder block 101 via a seal member (not shown) by use of bolts. In a muffler space 143 of the muffler 160, there is disposed a check valve 200 that reduces counter flow of the refrigerant gas from a discharge side refrigerant circuit to the discharge chamber 142.

The check valve 200 is disposed at a connecting portion between a communication path 144 formed across the cylinder head 104, the valve plate 103 and the cylinder block 101 to communicate with the discharge chamber 142, and the muffler space 143. The check valve 200 responds to a pressure difference between the communication path 144 (upstream side) and the muffler space 143 (downstream side) to operate, cuts off the communication path 144 when the pressure difference is less than a predetermined value, and opens the communication path 144 when the pressure difference is greater than the predetermined value. Therefore, the discharge chamber 142 is connected to the discharge side refrigerant circuit of the vehicle air conditioning system via a discharge passage constituted of the communication path 144, the check valve 200, the muffler space 143 and a discharge port 106a.

In the cylinder head 104, a control valve 300 is disposed.

The control valve 300 is interposed in a pressure supply passage 145 so that an after-mentioned fluid passage constitutes a part of the pressure supply passage 145 that allows the discharge chamber 142 to communicate with the crank chamber 140 behind the piston 136, and the control valve adjusts a valve opening degree and controls a discharged refrigerant gas introduction amount into the crank chamber 140. The refrigerant in the crank chamber 140 flows to a second space portion 141b of the suction chamber 141 via a pressure release passage 146 extending through a communication path 101c, a space 101d, an orifice 103c formed in the valve plate 103, and a communication hole (not shown) formed in a discharge valve forming body (not shown). In consequence, a pressure of the crank chamber 140 is changed by the control valve 300, and the inclination angle of the swash plate 111, i.e., a stroke of the piston 136 is changed, thereby variably controlling a discharge displacement of the refrigerant gas of the variable-displacement compressor 100.

Next, the control valve 300 of the present embodiment will be described in detail with reference to FIG. 2.

The control valve 300 includes a valve housing 301, a valve unit 310, a solenoid housing 311 fixed to the valve housing 301, a housing member 312, a coil unit 313, and a rubber sheet 314 serving as a first damping member, and has a constitution in which the valve unit 310 is driven and controlled by an electromagnetic force generated in the coil unit 313 to adjust an opening degree of an after-mentioned valve body 304 of the valve unit 310.

Additionally, in an outer peripheral portion of the control valve 300, three O-rings 315a to 315c are arranged, and by the O-rings 315a to 315c, a housing space of the control valve 300 formed in the cylinder head 104 is divided into a region in which the pressure of the crank chamber 140 acts, a region in which a pressure of the discharge chamber 142 acts and a region in which a pressure of the suction chamber 141 acts.

In the valve housing 301, there are formed a first pressure sensing chamber 302 that communicates with the crank chamber 140 by the pressure supply passage 145 on the crank chamber 140 side via a communication hole 301a; a valve chamber 303 that communicates with the discharge chamber 142 by the pressure supply passage 145 on a discharge chamber 142 side via a communication hole 301b; a valve hole 301c having one end being open to the first pressure sensing chamber 302 and the other end being open to the valve chamber 303; a second pressure sensing chamber 307 that is cut off from the valve chamber 303 and in which one end (on a movable iron core 308 side) of the valve body 304 is disposed to communicate with the suction chamber 141 via a communication hole 301e; and a valve seat 301f on which the other end (on a side opposite to the movable iron core side) of the valve body 304 abuts. A passage extending through the communication hole 301a, the valve hole 301c and the communication hole 301b corresponds to a fluid passage according to the present invention. In the first pressure sensing chamber 302, there is disposed a bellows assembly 305 that receives the pressure of the crank chamber 140 by disposing a spring in an evacuated inner portion. A coupling portion 306 is disposed between the bellows assembly 305 and the valve body 304, one end of the coupling portion 306 is attachably and detachably coupled with the bellows assembly 305, and the other end of the coupling portion 306 is fixed to the other end side of the valve body 304.

The valve unit 310 has the valve body 304 that opens and closes the above fluid passage in the valve housing 301, and the movable iron core 308 coupled with the valve body 304 via a solenoid rod 304a. More specifically, the other end of the valve body 304 disposed in the valve chamber 303 is attached to or detached from the valve seat 301f to open and close the valve hole 301a. An outer periphery of the valve body 304 is slidably supported in the support hole 301b formed in the valve housing 301. In addition, the solenoid rod 304a is formed integrally with the valve body 304, and the movable iron core 308 is pressed into and fixed to an end portion of the valve unit on a side opposite to the valve body 304 side. In an outer periphery of the solenoid rod 304a, a fixed iron core 309 is disposed to face the movable iron core 308 via a predetermined clearance. Between the fixed iron core 309 and the movable iron core 308, there is interposed a spring 316 that elastically urges the valve body 304 in a valve opening direction via the movable iron core 308 and the solenoid rod 304a. The movable iron core 308, the fixed iron core 309, an after-mentioned coil side end portion member 313c (see FIG. 4) of the coil unit 313 and the solenoid housing 311 constitute a magnetic circuit. When a current flows through an after-mentioned coil 313b (see FIG. 4) of the coil unit 313, the electromagnetic force acts on the movable iron core 308, and this electromagnetic force urges the valve body 304 in a valve closing direction via the solenoid rod 304a against an elastic force of the spring 316.

Figure 3:
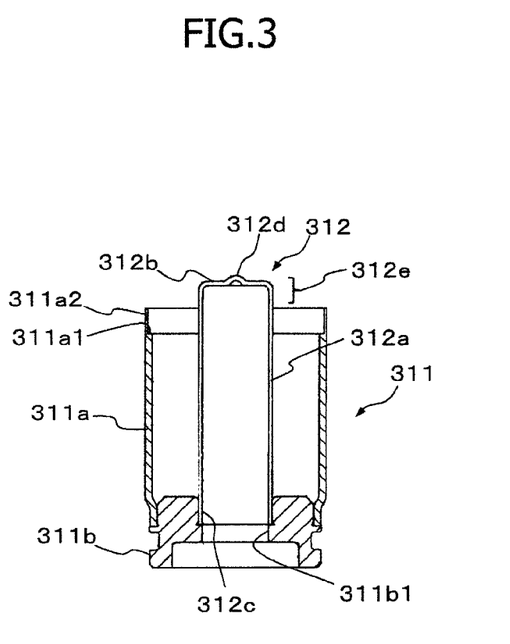
FIG. 3 is a cross-sectional view of a solenoid housing and a housing member of the control valve of the above embodiment.

As illustrated in FIG. 3, the solenoid housing 311 includes a cylindrical peripheral wall 311a disposed around the housing member 312, and an end wall 311b that closes a portion between one end portion of the peripheral wall 311a and a tube opening side end portion 312c of the housing member 312 and is fixed to the valve housing 301 and in a central portion of which a through hole 311b1 is formed. Furthermore, a peripheral edge of an after-mentioned end portion member 313B (the coil side end portion member 313c) of the coil unit 313 is fixed to the other end portion of the peripheral wall 311a. One end portion of the peripheral wall 311a is positioned at an outer edge of the end wall 311b and integrated with the end wall 311b by brazing. In the other end portion of the peripheral wall 311a, a stepped portion 311a1 is formed, and consequently, a tip portion 311a2, wall thickness of which is small, is formed.

Figure 2:
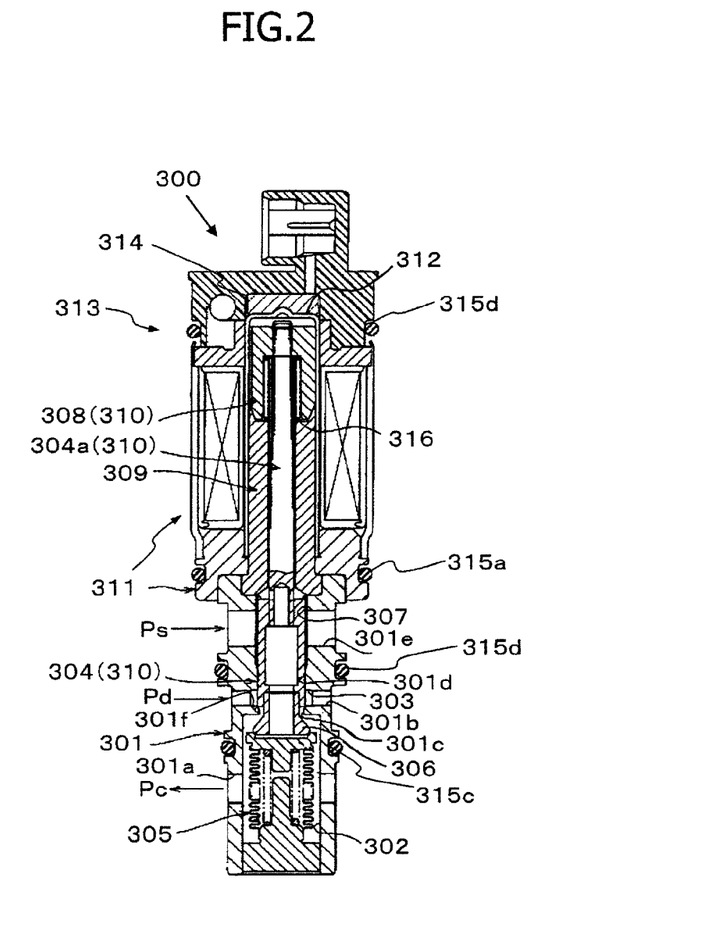
FIG. 2 is a cross-sectional view of the control valve of the above embodiment.

The housing member 312 is formed into a tubular shape with a bottom and slidably houses the movable iron core 308, and specifically, as illustrated in FIG. 2 and FIG. 3, the housing member includes a cylindrical peripheral wall 312a and a bottom wall 312b that closes one end of the peripheral wall 312a, and is made of a nonmagnetic material fixed to the solenoid housing 311. The tube opening side end portion 312c of the housing member 312 is positioned on a hole inner wall of the through hole 311b1 and integrated with the solenoid housing 311 (the end wall 311b) by the brazing. Additionally, in the present embodiment, a convex portion 312d that engages with a concave portion 314a formed in the after-mentioned rubber sheet 314 is formed in the bottom wall 312b of the housing member 312. In addition, as illustrated in FIG. 3, a tube bottom side end portion 312e of the housing member 312 projects out from the solenoid housing 311.

Figure 4:
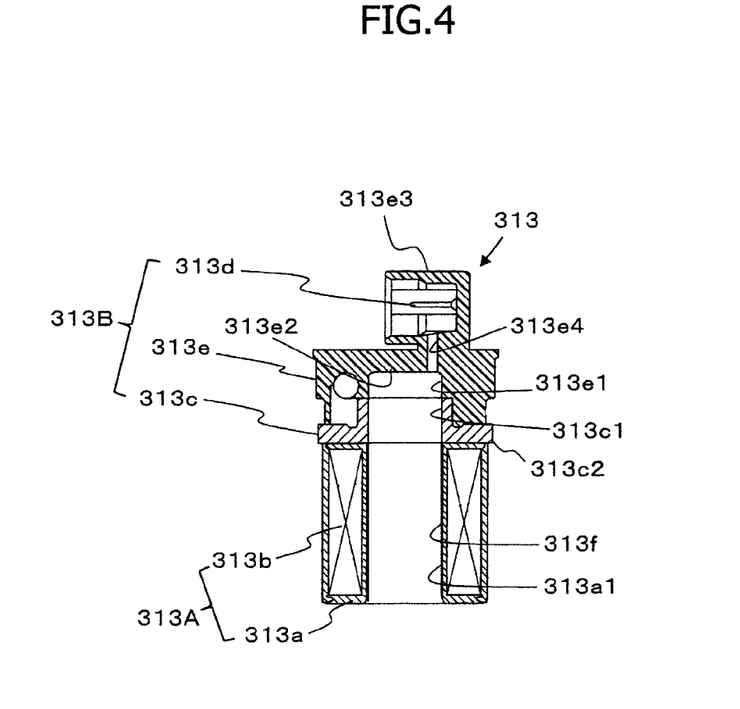
FIG. 4 is a cross-sectional view of a coil unit of the control valve of the embodiment.

As illustrated in FIG. 2 and FIG. 4, the coil unit 313 has a drive coil portion 313A housed in the solenoid housing 311 to be disposed around the housing member 312, and the end portion member 313B integrated with the drive coil portion 313A and formed to cover the tube bottom side end portion 312e of the housing member 312.

As illustrated in FIG. 4, the drive coil portion 313A includes, for example, a bobbin 313a and a coil 313b wound around the bobbin 313a. For example, as illustrated in FIG. 2 and FIG. 4, the end portion member 313B includes: the coil side end portion member 313c that covers the tube bottom side end portion 312e including a part of the peripheral wall 312a and the bottom wall 312b of the housing member 312 and an peripheral edge of the coil side end portion member 313c is positioned and fixed to the other end of the peripheral wall 311a of the solenoid housing 311; a connection terminal 313d connected to the coil 313b; and a closing end portion 313e made of a resin, disposed to protect the connection terminal 313d and to close a non-coil side of the coil side end portion member 313c, and projecting from the solenoid housing 311. The bobbin 313a, the coil 313b, the coil side end portion member 313c, the connection terminal 313d and the closing end portion 313e are coated with a resin and integrated.

Specifically, the coil side end portion member 313c is constituted of a cylindrical portion 313c1, and a substantially round flat plate portion 313c2 extending out from one end side of the cylindrical portion 313c1 in a radial direction. A peripheral edge of the flat plate portion 313c2 projects from an outer peripheral surface of the drive coil portion 313A, and is positioned in the stepped portion 311a1 of the solenoid housing 311. In consequence, the coil unit 313 integrated by the resin is positioned in the solenoid housing 311. In this state, the tip 311a2 (see FIG. 3) of the peripheral wall 311a of the solenoid housing 311 is bent inward to caulk the peripheral edge of the flat plate portion 313c2 as illustrated in FIG. 2, so that the coil unit 313 is fixed to the solenoid housing 311.

In a central portion of the coil unit 313, a housing chamber 313f that houses the housing member 312 is formed. The housing chamber 313f is formed of a peripheral wall and a bottom wall, the peripheral wall includes a cylindrical portion 313a1 of the bobbin 313a, the cylindrical portion 313c1 of the coil side end portion member 313c, and a cylindrical portion 313e1 of the closing end portion (molded resin) 313e, and the bottom wall is constituted of a bottom wall 313e2 of the closing end portion 313e. Additionally, in the closing end portion 313e, there is formed a communication hole 313e4 that communicates with an atmosphere via inner portions of the housing chamber 313f and a connector housing 313e3. The communication hole 313e4 functions as an air vent hole in the housing chamber 313f, for example, when the housing member 312 is inserted into the housing chamber 313f.

Figure 5:
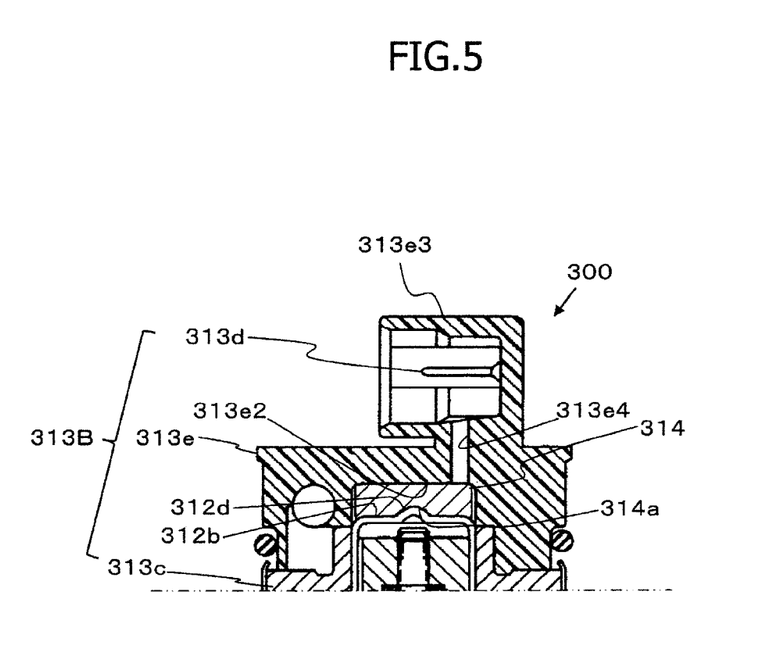
FIG. 5 is a partially enlarged cross-sectional view of the control valve of the embodiment.
Figure 6:
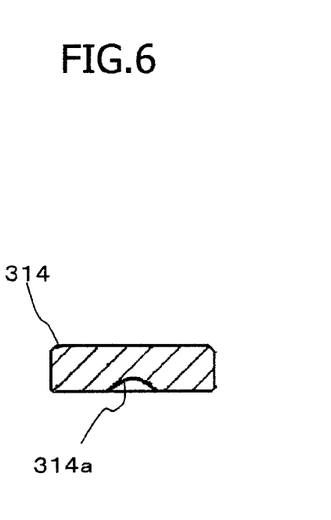
FIG. 6 is a cross-sectional view of a first damping member of the control valve of the embodiment.

As illustrated in FIG. 2 and FIG. 5, the rubber sheet 314 is disposed between the bottom wall 312b of the housing member 312 and the end portion member 313B (the closing end portion 313e). The rubber sheet 314 is made of, for example, a rubber material that presses the bottom wall 312b of the housing member 312 and the end portion member 313B. Specifically, the rubber sheet 314 is disposed between the bottom wall 312b of the housing member 312 and the bottom wall 313e2 of the coil unit 313, and presses the bottom wall 312b of the housing member 312 and the bottom wall 313e2 of the coil unit 313 when the coil unit 313 is positioned and fixed to the solenoid housing 311. As illustrated in FIG. 6, the rubber sheet 314 is shaped in the form of, for example, a disc, and an outer diameter of the rubber sheet is less than a tube outer diameter of the housing member 312. In consequence, when the coil unit 313 is inserted and housed in an integral constitution of the solenoid housing 311 and the housing member 312, the rubber sheet 314 does not come in contact with the peripheral walls (313a1, 313c1 and 313e1) forming the housing chamber 313f, and the rubber sheet 314 can be prevented from falling. It is to be noted that there is not any special restriction on the first damping member as long as the member has an elasticity, and a material other than the rubber material may be a soft resin, e.g., a fluororesin sheet. The control valve 300 reaches a high temperature of 150° C. or more sometimes, and hence, a material of the first damping member is selected in consideration of a heat resistance.

Additionally, in the present embodiment, a positioning portion is disposed to position the rubber sheet 314 in the bottom wall 312b of the housing member 312. For example, as illustrated in FIG. 5 and FIG. 6, the concave portion 314a is formed in the center of one end surface of the rubber sheet 314, and the concave portion 314a engages with the convex portion 312d formed on the bottom wall 312b of the housing member 312. The rubber sheet 314 is set to the bottom wall 312b of the housing member 312 to position the concave portion 314a with the convex portion 312d, and hence, the rubber sheet 314 can easily be positioned on the bottom wall 312b. Additionally, when the coil unit 313 is housed in the solenoid housing 311, the rubber sheet 314 can more securely be prevented from falling from the bottom wall 312b.

Next, there will schematically be described an operation of the variable-displacement compressor 100 in which the control valve 300 of the above constitution is used.

In the control valve 300, a bellows effective area Sb of the bellows assembly 305, a pressure receiving area Sv of the crank chamber 140 that receives, from a valve hole 301c side, the pressure acting on the valve body 304 and a pressure receiving area Sr of the pressure of the suction chamber 141 that acts on the valve body 304 in the second pressure sensing chamber 307 are set to about the same value, and when the pressure of the discharge chamber 142 that acts on the valve chamber 303 does not act in an opening or closing direction of the valve body 304, a force acting on the valve body 304 is represented by the following equation (1).

$$Ps=-(1/Sb) \cdot F(i)+(F+f)/Sb \quad (1),$$

in which Ps is the pressure of the suction chamber 141, F(i) is an electromagnetic force, f is an urging force of the spring 316, and F is an urging force of the bellows assembly 305.

Here, the valve body 304, the bellows assembly 305 and the coupling portion 306 constitute pressure sensing means. When the pressure of the suction chamber 141 becomes greater than a predetermined pressure (hereinafter referred to as "the set pressure") determined by the above equation (1) and a current (i) flowing through the coil 313b, this pressure sensing means contracts the bellows assembly 305, reduces the opening degree of the pressure supply passage 145, and lowers the pressure of the crank chamber 140 to enlarge a discharge displacement. Furthermore, when the pressure of the suction chamber 141 becomes less than the set pressure, the pressure sensing means elongates the bellows assembly 305, increases the opening degree of the pressure supply passage 145 and raises the pressure of the crank chamber 140 to reduce the discharge displacement, thereby executing autonomous control so that the pressure of the suction chamber 141 comes close to the set pressure. It is to be noted that the electromagnetic force acts on the valve body 304 via the solenoid rod 304a in the valve closing direction, and hence, when an energization amount to the coil 313b is increased, the opening degree of the pressure supply passage 145 decreases, and the set pressure of the pressure sensing means decreases. That is, to decrease the set pressure, the energization amount is increased, and to increase the set pressure, the energization amount is reduced.

When an air conditioner is operated, i.e., in a state in which the variable-displacement compressor 100 is operated, the energization amount of the coil 313b is set according to a set air conditioning temperature, and the opening degree of the pressure supply passage 145 is autonomously controlled by the pressure sensing means so that a pressure Ps of the suction chamber 141 is maintained at the set pressure determined by the energization amount and the above equation (1). As described above, in the present embodiment, the control valve 300 includes the pressure sensing means and senses the pressure of the suction chamber by this pressure sensing means to autonomously control the opening degree, but the control valve may adjust the energization amount to the coil 313b according to the pressure Ps of the suction chamber to control the opening degree of the pressure supply passage 145. In this case, the pressure sensing means does not have to be provided.

Next, a vibration reduction operation of the control valve 300 of the present embodiment will be described in comparison with a conventional control valve.

First, the coil 313b is driven by pulse width modulation (PWM control) at a predetermined frequency in a range of, e.g., 400 Hz to 500 Hz, and the integral constitution of the valve body 304, the solenoid rod 304a and the movable iron core 308 repeatedly receives an external force corresponding to a current amplitude generated by the PWM control to vibrate. By this vibration, collision repeatedly occurs between the valve body 304 and a support hole 301d and between the movable iron core 308 and the peripheral wall 312a of the housing member 312, and the valve housing 301, the solenoid housing 311 and the housing member 312 vibrate. In addition, when the opening degree is to be maintained in a state in which the valve body 304 is disposed close to the valve seat 301f, the collision further repeatedly occurs between the valve body 304 and the valve seat 301f.

Here, in the case of the conventional control valve including no rubber sheet 314, the vibration of the housing member 312 is radiated as the noise to the outside of the control valve 300 through the following three paths (Path 1 to Path 3).

Path 1: The tube opening side end portion 312c of the housing member 312 is fixed to the solenoid housing 311, and hence, the vibration of the housing member 312 is transmitted to the coil side end portion member 313c via the end wall 311b and the peripheral wall 311a of the solenoid housing 311 to vibrate the coil unit 313, and is radiated as the noise from the surface of the closing end portion 313e to the outside of the control valve 300.

Path 2: The peripheral wall 312a of the housing member 312 partially comes in contact with the cylindrical portion 313c1 of the coil side end portion member 313c in a certain case, and in this case, the vibration of the housing member 312 is directly transmitted to the end portion member 313c to vibrate the coil unit 313, and is radiated as the noise from the surface of the closing end portion 313e to the outside of the control valve 300.

Path 3: The vibration of the housing member 312 propagates to a space between the bottom wall 312b of the housing member 312 and the bottom wall 313e2 of the closing end portion 313e, and this vibration propagates to an internal space of the connector housing 313e3 via the communication hole 313e4 (see FIG. 4 and FIG. 5) formed in the closing end portion 313e, and leaks from a clearance between the connector housing 313e3 and an opposite connector housing to be radiated to the outside of the control valve 300.

Furthermore, the closing end portion 313e of the control valve is prevented from falling by a snap ring (not shown), and hence, the vibration of the coil unit 313 is transmitted to the snap ring, so that the noise of the control valve is amplified.

However, in the control valve 300 of the present embodiment, the bottom wall 312b of one end side of the housing member 312 and the bottom wall 313e2 of the closing end portion 313e are pressed by the rubber sheet 314, and hence, the tube opening side end portion 312c (see FIG. 3) of the housing member 312 is fixed to the solenoid housing 311 (the end wall 311b), and the bottom wall 312b is held by the coil unit 313 (the closing end portion 313e) via the rubber sheet 314. Thus, the housing member 312 is stably held at two positions of the tube opening side end portion 312c and the bottom wall 312b, and hence, even when the movable iron core 308 vibrates in the housing member 312 to repeatedly collide with the peripheral wall 312a of the housing member 312, the vibration of the housing member 312 is reduced.

Therefore, the noise generated via the abovementioned paths 1 and 2 is reduced, and the noise transmitted through the path 3 almost disappears. Furthermore, the vibration of the coil unit 313 is reduced from being transmitted to the snap ring, and consequently, the noise of the control valve 300 is also reduced.

As described in the foregoing, according to the control valve 300 of such a constitution, the rubber sheet 314 as the first damping member is disposed between the bottom wall 312b of the housing member 312 slidably housing the movable iron core 308 coupled with the valve body 304 that opens and closes the fluid passage and the end portion member 313B of the coil unit 313, and hence, even when the movable iron core 308 vibrates to repeatedly collide with the peripheral wall of the housing member 312, the vibration of the housing member 312 can be reduced by the first damping member. In addition, the collision of the housing member 312 with the end portion member 313B can also be reduced, and hence, the noise to be radiated to the outside of the control valve can effectively be reduced.

Additionally, in the coil unit 313 of the present embodiment, the peripheral edge of the coil side end portion member 313c is caulked and fixed on the tip side of the peripheral wall 311a of the solenoid housing 311, and additionally, the closing end portion 313e is elastically supported by the rubber sheet 314. As described above, the coil unit 313 is stably held at two positions of the peripheral edge of the coil side end portion member 313c and the bottom wall 313e2 of the closing end portion 313e, and hence, when the vibration of the valve housing 301 and the solenoid housing 311 is transmitted to the coil unit 313 via the peripheral wall 311a and the housing member 312, the vibration of the coil unit 313 itself can be reduced. In addition, the first damping member is easily disposed, the coil unit 313 is positioned and fixed to the solenoid housing 311, and simultaneously, the first damping member is constituted to press the bottom wall 313e2 of the coil unit 313, so that assembling properties do not decrease.

In addition, the rubber sheet 314 can close the communication hole 313e4 formed in the coil unit 313, and hence, in a transport and storage stage from when the control valve 300 is manufactured until the control valve is attached to the variable-displacement compressor 100, water vapor included in the air atmosphere can be prevented from penetrating into the solenoid housing 311. Furthermore, in a transport and storage stage until the variable-displacement compressor 100 is attached to the vehicle, the water vapor included in the air atmosphere can be prevented from penetrating into an inner portion of the solenoid housing 311 and a region of an outer periphery of the solenoid housing 311 (the region between the O-ring 315a and an O-ring 315d) via the communication hole 313e4, and hence, degradation of the coil unit 313 and corrosion of the solenoid housing 311 due to water penetration can be avoided.

The rubber sheet 314 as the first damping member is shaped in the form of the disc, but is not limited to the disc form, and may be formed into an annular shape, and there is not any special restriction on the shape. In addition, there has been illustrated the case in which the convex portion 312d is formed on the bottom wall 312b of the housing member 312 and the concave portion 314a is formed in the rubber sheet 314, but the present invention is not limited thereto, and a concave portion may be formed in the bottom wall 312b and a convex portion may be formed in the rubber sheet 314. In addition, the case in which the positioning portions (the convex portion and the concave portion) are provided has been illustrated, but any positioning portions do not have to be provided, and there may be provided, for example, a constitution in which the rubber sheet 314 is bonded to the bottom wall 312b of the housing member 312.

In addition, the communication hole 313e4 that communicates with the inner portion of the connector housing opens in the bottom wall 313e2 of the closing end portion 313e, and the rubber sheet 314 closes the opening of the communication hole 313e4 when the coil unit 313 is positioned and fixed to the solenoid housing 311. However, when the control valve 300 is completed and an airtight inspection or the like of the inner portion of the solenoid housing 311 is then performed by using the communication hole 313e4 of this control valve, a through hole may be formed at a place corresponding to the communication hole 313e4 in the rubber sheet 314 so that the rubber sheet 314 does not close the communication hole 313e4.

Figure 7:
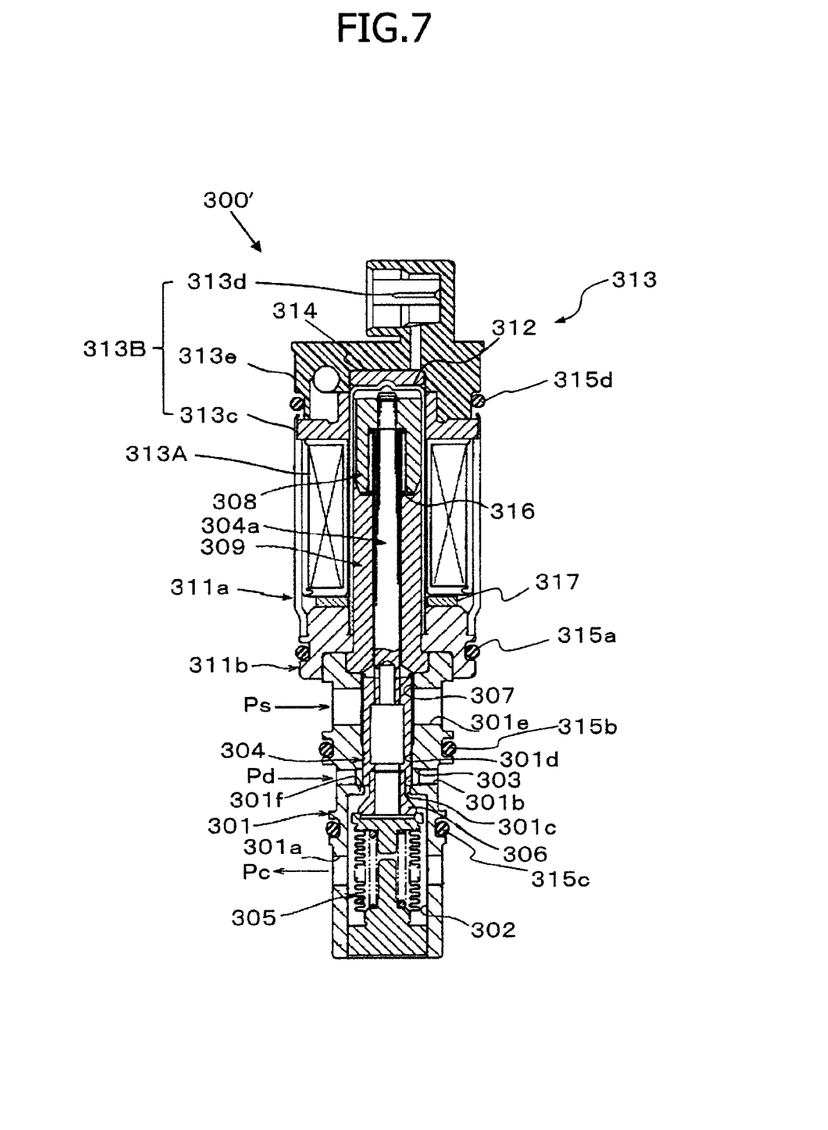
FIG. 7 is a cross-sectional view of a control valve according to a second embodiment of the present invention.

FIG. 7 illustrates a cross-sectional view of a control valve 300' according to a second embodiment of the present invention. It is to be noted that the same elements as in the control valve 300 of the first embodiment illustrated in FIG. 2 are denoted with the same reference symbols to omit description thereof, and different portions will only be described.

In the control valve 300' of the present embodiment, a rubber sheet 317 is disposed as a second damping member between an end wall 311b of a solenoid housing 311 and a drive coil portion 313A. The rubber sheet 317 presses one end surface of a coil unit 313 (the end surface on a non-end portion member 313B side), when the coil unit 313 is positioned and fixed to the solenoid housing 311. That is, one end surface of the coil unit 313 is elastically supported by the end wall 311b of the solenoid housing 311 via the rubber sheet 317, and a peripheral edge of a coil side end portion member 313c is fixed to a tip side of a peripheral wall 311a of the solenoid housing 311. Furthermore, a bottom wall 313e2 of a closing end portion 313e is elastically supported by a rubber sheet 314. As described above, the coil unit 313 is stably held by the solenoid housing 311 at three positions of the one end surface of the coil unit, the peripheral edge of the coil side end portion member 313c and the bottom wall 313e2.

Figure 8:
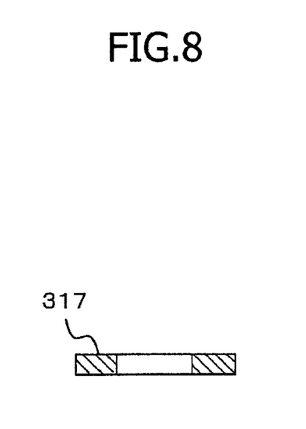
FIG. 8 is a cross-sectional view of a second damping member of the control valve of the second embodiment.

As illustrated in FIG. 7 and FIG. 8, the rubber sheet 317 is made of a rubber material and formed into an annular shape. In addition, the rubber sheet 317 is formed so that an inner diameter of the rubber sheet is slightly greater than an outer diameter of a peripheral wall 312a of a housing member 312. In consequence, the peripheral wall 312a of the housing member 312 as a guide can easily position the rubber sheet 317 on the end wall 311b of the solenoid housing 311. That is, the peripheral wall 312a of the housing member 312 also serves as a guide member to position the rubber sheet 317 on the end wall 311b of the solenoid housing 311. It is to be noted that there is not any special restriction on the rubber sheet 317 as the second damping member as long as the rubber sheet has an elasticity, and, for example, an O-ring may be used, but to stably support the one end surface of the coil unit 313, a sheet-like elastic member is preferably used because a large surface area can be obtained. In addition, a material other than the rubber material may be a soft resin, and, for example, a fluororesin sheet may be used. A material of the rubber sheet 317 as the second damping member is selected in consideration of a heat resistance in the same manner as in a first damping member (the rubber sheet 314).

According to the control valve 300' of such a constitution, the rubber sheet 317 as the second damping member is disposed between the end wall 311b of the solenoid housing 311 and the drive coil portion 313A, and hence, the coil unit 313 can stably be held by the solenoid housing 311 at the three positions of the one end surface of the coil unit, the peripheral edge of the coil side end portion member 313c and the bottom wall 313e2. Therefore, even when vibration is transmitted to the coil unit 313 via the peripheral wall 311a of the solenoid housing 311, the vibration of the coil unit 313 itself can more effectively be reduced, and noise to be radiated to the outside of the control valve 300' can further be reduced.

In addition, the second damping member is easily disposed, the coil unit 313 is positioned and fixed to the solenoid housing 311, and simultaneously, the second damping member is configured to press the one end surface of the coil unit 313, so that assembling properties do not decrease.

Figure 9:
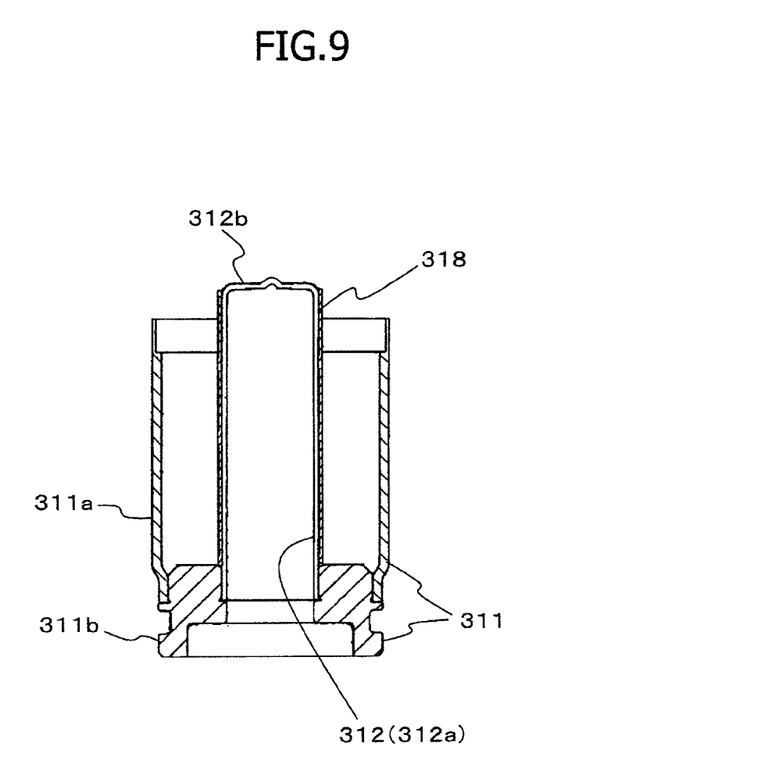
FIG. 9 is a view illustrating a modification of the control valve according to the first or second embodiment.

FIG. 9 is a view to explain a modification of the control valves 300 and 300' of the first embodiment and the second embodiment, and illustrates a cross-sectional view of a solenoid housing 311 and a housing member 312. As illustrated in FIG. 9, the present modification further includes a third damping member 318 that surrounds a peripheral wall 312a of the housing member 312. As the third damping member 318, for example, a heat-shrinkable tube is suitable, and a material is selected in consideration of a heat resistance. In this case, the housing member 312 is brazed to the solenoid housing 311, and then, the heat-shrinkable tube is disposed around the housing member 312 and allowed to stand in a temperature environment in which the tube can thermally shrink, so that the third damping member can easily be formed on an outer surface of the peripheral wall 312a of the housing member 312. Additionally, in a solenoid structure in which the housing member 312 is not brazed to the solenoid housing 311, a coating layer of a resin may beforehand be formed on the outer surface of the housing member 312 by application or the like.

A control valve according to such a modification includes the third damping member 318 that surrounds the peripheral wall 312a of the housing member 312, so that vibration of the housing member 312, vibration to be transmitted along the outer surface of the housing member 312 and noise to be radiated from the outer surface of the housing member 312 can effectively be reduced. Therefore, the noise generated via the abovementioned paths 1 to 3 can more effectively be reduced.

It is to be noted that, in the control valves of the first and second embodiments and the modification illustrated in FIG. 9, the movable iron core 308 is disposed on the bottom wall 312b side of the housing member 312, but the present invention is not limited to this structure, and the fixed iron core 309 may be disposed on the bottom wall 312b side. In addition, there has been illustrated the case in which both of the movable iron core 308 and the fixed iron core 309 are housed in the housing member 312, but the present invention is not limited to the case, and at least the movable iron core 308 may be housed in the housing member 312. For example, the housing member 312 may have a structure in which the movable iron core 308 is joined to one opening end of a pipe (the peripheral wall 312a) to close one opening, and the movable iron core 308 is housed. In this case, the movable iron core 308 also serves as the bottom wall 312b of the housing member 312.

Furthermore, each of the above first and second embodiments and the modification of these embodiments has the assumption that the first damping member is provided, but when a damping effect can sufficiently be obtained only by the second damping member, the first damping member does not have to be provided, but the second damping member may only be provided. Furthermore, when the damping effect can sufficiently be obtained only by the third damping member, the third damping member may only be provided. In addition, the first damping member does not have to be provided, and the second damping member and the third damping member may only be provided.

Furthermore, in the above description, there has been illustrated the case in which the control valve is applied to the discharge displacement control of the variable-displacement compressor for use in the vehicle air conditioning system, but the present invention is not limited to this use application, and may be used in a use application of opening and closing the fluid passage.

In addition, according to the variable-displacement compressor 100 of the present invention, the control valves 300 and 300' in which the vibration is reduced are used, and hence, the noise to be radiated from the control valve to the outside can be reduced. It is to be noted that, as the variable-displacement compressor 100 in which the control valve 300 or 300' is used, the example of the clutchless compressor has been illustrated, but a solenoid clutch may be attached to the variable-displacement compressor. In addition, the variable-displacement compressor is not limited to the swash plate type and may be a swingable plate type variable-displacement compressor, and further, the variable-displacement compressor is not limited to the reciprocating type, and may be any type of variable-displacement compressor.

REFERENCE SYMBOL LIST

100 Variable-displacement compressor
140 Crank chamber (control pressure chamber)
141 Suction chamber
142 Discharge chamber
145 Pressure supply passage
300 and 300' Control valve
301 Valve housing
304 Valve body
308 Movable iron core
310 Valve unit
311 Solenoid housing
311a Peripheral wall
311b End wall
312 Housing member
312a Peripheral wall
312b Bottom wall
312c Tube opening side end portion
312d Convex portion
312e Tube bottom side end portion
313 Coil unit
313A Drive coil portion
313B End portion member
314 First damping member (rubber sheet)
314a Concave portion
317 Second damping member (rubber sheet)
318 Third damping member

The invention claimed is:

1. A control valve comprising:
    a valve unit having a valve body that opens and closes a fluid passage in a valve housing, and a movable iron core coupled with the valve body;
    a housing member which is formed into a tubular shape with a bottom and slidably houses at least the movable iron core; and
    a coil unit having a drive coil portion housed in a solenoid housing fixed to the valve housing to be disposed around the housing member, and an end portion member integrated with the drive coil portion and formed to cover a tube bottom side end portion of the housing member,
    the control valve being configured to drive and control the valve unit by an electromagnetic force generated by the drive coil portion, thereby adjusting an opening degree of the valve body,
    wherein a first damping member is disposed between a bottom wall of the housing member and the end portion member.

2. The control valve according to claim 1,
    wherein the first damping member comprises an elastic member that presses the bottom wall of the housing member and the end portion member.

3. The control valve according to claim 1, further comprising
    a positioning portion that positions the first damping member on the bottom wall of the housing member.

4. The control valve according to claim 3,
    wherein the positioning portion comprises a convex portion formed on one of the bottom wall and the first damping member, and a concave portion formed in the other one of the bottom wall and the first damping member.

5. The control valve according to claim 1,
    wherein the solenoid housing comprises a peripheral wall disposed around the housing member, and an end wall that closes a portion between one end portion of the peripheral wall and a tube opening side end portion of the housing member and is fixed to the valve housing, and a peripheral edge of the end portion member is fixed to the other end portion of the peripheral wall, wherein a second damping member is disposed between the end wall of the solenoid housing and the drive coil portion.

6. The control valve according to claim 5, wherein the second damping member is formed into an annular shape to surround the peripheral wall of the housing member.

7. The control valve according to claim 5, further comprising
a third damping member that surrounds the peripheral wall of the housing member.

8. The control valve according to claim 7, wherein the third damping member is a heat-shrinkable tube.

9. A variable-displacement compressor comprising:
a pressure supply passage that allows a discharge chamber of a refrigerant gas to communicate with a control pressure chamber; and
the control valve according to claim 1, interposed in the pressure supply passage,
wherein the control valve adjusts an opening degree of the pressure supply passage to control a pressure of the control pressure chamber, and to make a discharge displacement of the refrigerant gas variable.

* * * * *